US005648011A

United States Patent [19]
Blonsky

[11] Patent Number: 5,648,011
[45] Date of Patent: Jul. 15, 1997

[54] STRUCTURALLY STABLE GELLED ELECTROLYTES

[75] Inventor: Peter Miller Blonsky, Meridian, Id.

[73] Assignee: Micron Communications, Inc., Boise, Id.

[21] Appl. No.: 407,484

[22] Filed: Mar. 15, 1995

[51] Int. Cl.$^6$ .................... H01M 6/16; H01M 6/18
[52] U.S. Cl. .................... 252/62.2; 429/190; 429/189; 429/191; 429/192; 429/209; 427/80; 427/79; 427/126.1; 427/553; 427/558; 427/496; 427/388.1; 427/389.7; 427/393.5; 427/508
[58] Field of Search .................... 252/62.2, 500, 252/512, 518, 520, 521, 510, 511; 429/189, 190, 192, 191, 193, 209, 212, 213; 427/80, 79, 126.1, 553, 558, 496, 508, 388.1, 389.7, 393.5; 428/221

[56] References Cited

U.S. PATENT DOCUMENTS

| | | | |
|---|---|---|---|
| 4,419,423 | 12/1983 | Leger | 429/197 |
| 4,470,677 | 9/1984 | Williams et al. | 429/190 |
| 4,830,939 | 5/1989 | Lee et al. | 429/192 |
| 4,834,772 | 5/1989 | Dixon et al. | 429/190 |
| 5,141,827 | 8/1992 | Fritz et al. | 429/191 |
| 5,166,008 | 11/1992 | Tomida et al. | 429/190 |
| 5,421,982 | 6/1995 | Ikeda et al. | 204/414 |
| 5,460,903 | 10/1995 | St. Aubyn Hubbard et al. | 252/62.2 |

*Primary Examiner*—Alan D. Diamond
*Attorney, Agent, or Firm*—Wells, St. John, Roberts, Gregory & Matkin, P.S.

[57] ABSTRACT

The structurally stable gelled electrolyte of the present invention includes a base electrolyte, a three-dimensional polymer precursor that is radiation curable and an electrically non-conducting solvent gelling agent. The base electrolytes of this invention are comprised of an aprotic liquid and a dissolved ionizable alkaline metal salt. The preferred radiation curable polymer pre-cursors of this invention include trimethylol propane ethoxy triacrylate (TMPEOTA) and poly(ethylene glycol) diacrylate (PEGDA). The solvent gelling agent should be a solid powder or polymer with high surface area to adsorb the liquid electrolyte. Solid powders that can be used in the gelling agent include inorganic oxygen compounds such as silica ($SiO_2$), titania ($TiO_2$), alumina ($Al_2O_3$), magnesium oxide (MgO), barium oxide ($B_2O_3$) and the like. Other compounds that can be used in the gelling agent include super absorbent polymers, clays, zeolite and such. The structurally stable gelled electrolyte of this invention is coated onto a suitable substrate, for example a glass plate, metal foil, a battery electrode web and cured, either in place, or can be used as a free standing film for cell assembly.

42 Claims, No Drawings

STRUCTURALLY STABLE GELLED ELECTROLYTES

FIELD OF THE INVENTION

The present invention relates to electrolytes for use in electrochemical devices, more particularly to structurally stable gelled electrolytes.

BACKGROUND OF THE INVENTION

A conventional battery generates useful electricity through a series of electrochemical reactions. A battery unit is often referred to as a "cell". The electrochemical reaction involves the transfer of electrons and ions between two electrodes: a negative electrode and a positive electrode. The electrodes are immersed in an ion-conducting medium, termed the electrolyte. The negative electrode, or anode, loses electrons; the positive electrode or cathode, gains electrons. The electrodes are connected by an external circuit to a device or "load" (such as a light bulb, gear or radio).

The electrons, during discharge, flow out of the cell, through external wires and/or devices to do work and then return to the opposite side (pole) of the cell to complete the circuit. The ratio of electrons to ions are generally integer multiples of each other, ranging from 1:1 to 3:1 (electrons:ions). In general, the higher the conductivity of the electrolyte medium, the easier the ions can be transported, from the anode to the cathode, and the higher the rate (current) and/or lower the temperature at which the cell will supply electrons to run an external device.

The electrolyte in a typical high energy lithium battery is a mixture of anhydrous, aprotic liquids in which a simple or complex salt of Group IA, Group IIA, or Group IIIA of the periodic table has been dissolved. An aprotic liquid is a liquid in which there is no free acidic hydrogen. The anode material in these systems is sufficiently chemically reactive with water to preclude the use of aqueous electrolytes. The purpose of the electrolyte in a battery is to act as the medium to facilitate the transport of ions from the anode, in this case the lithium, sodium or like metal, to the cathode during the discharge of the cell. Cathodes are generally transition metal oxides or sulfides. Cells with this construction require the use of a material known as a separator which functions to prevent the anode from coming into direct contact with the cathode. If contact occurred the cell would self discharge by allowing the ions and electrons to flow internally and no useful external work would be accomplished. During recharge the direction of electron and ion flow is the reverse of discharge and the electrons and ions are driven back towards the anode as energy is put back into the cell from an external source.

Polymer based electrolytes represent an improvement over earlier conventional liquid electrolyte batteries because polymer based systems no longer employ free liquids which are generally highly volatile, flammable, and sometimes toxic. The polymer based electrolytes typically include an interpenetrating network (IPN) composed of a conducting liquid in polymer phase and a lower conductivity supporting polymer matrix. It is generally accepted, however, that liquid electrolytes have higher conductivities, better rate capabilities, and a wider operational temperature range than polymer based network systems.

For a polymer based electrolyte to be effective it needs to: 1) have a high conductivity over a wide temperature range; 2) remain structurally stable during manufacturing, cell assembly, storage and usage; 3) prevent flow from occurring within the cell to prevent self-discharge, and 4) be capable of preparation in an easy and repeatable manner.

Lee et al., U.S. Pat. No. 4,830,939, describes a radiation curable polymer matrix as the electrolyte to act as both the separator and ion transport medium in a battery cell. Specifically, the patent teaches the use of acrylates and methacrylates which have higher conductivities than polyethylene oxide (PEO) based electrolytes or other interpenetrating network (IPN) systems. While this system is structurally stable and eliminates the use of a free liquid, it's ionic conductivity is limited by the presence of the polymer matrix, especially at sub-ambient operating temperatures. The traditional non-aqueous electrolyte is bound up within the radiation cross-linked polymer matrix to form a self-supporting, structurally stable film which can be processed into shapes and cells. The high levels of binder restricts ion motion during discharge and recharge and therefore limits the useful temperature range of operation and rate capability in cells using this type of electrolyte. The primary advantage of the matrix electrolyte is the safety and ease of handling.

Fritz, U.S. Pat. No. 5,141,827, teaches the use of chemically inert solids to gel "traditional" liquid electrolytes, thus, retaining the high conductivity of a liquid system without the mess and problems associated with liquids. Fritz also describes how the separator can be eliminated by use of a paste electrolyte. The Fritz patent discloses conductivities as high as the selected aprotic electrolyte system used alone in a liquid phase and higher than the conductivities of the radiation curable polymer matrixes. However, the preferred invention of Fritz is unable to retain dimensional stability. The patent describes the final product as having a consistency ranging from a dry dust to a loose paste. To get the high conductivity the material is gelatinous or paste-like, as a result of the amount of liquid component (high volume content) used and would easily be moved if non-uniform pressure was applied during conventional manufacturing of the cell; such as in the jelly rolling or lamination of the cell. It is also possible that the high conductivity gel would flow or migrate during long term storage or usage.

Leger, U.S. Pat. No. 4,419,423, teaches the use of an active metal anode such as lithium, a heat-dried manganese dioxide containing cathode which contains less than 1 weight percent water and a liquid organic electrolyte comprising lithium triflouromethane sulfonate ($LiCF_3SO_3$) dissolved in propylene carbonate (PC) and dimethoxyethane (DME). While the invention of Leger is chemically stable in a high energy battery environment and providing excellent manganese utilization, extreme care needs to be taken to protect the electrolyte mixture from shifting from the preferred formulation due to evaporation of the highly volatile DME component. Also the Leger system poses numerous environmental health and safety concerns. Caution during manufacturing is required to protect workers from fumes and potential fire hazards associated with the free liquids. This system also requires the use of dried cathodes to eliminate internal gassing or bulging of the cells and degradation of the lithium anode.

What is still needed is an electrolyte that retains the high conductivity, rate capability, and low operating temperatures associated with the liquid electrolyte and gelled liquid system that can also provide the dimensional stability found in the IPN electrolyte systems.

What is also needed is an electrolyte with the desirable high conductivity, rate capability, and low operating temperatures that also possesses improved environmental health and safety characteristics.

SUMMARY OF THE INVENTION

It is an object of the present invention to provide a structurally stable gelled electrolyte that has a high conductivity, high rate capability, and wide operating temperature range similar to levels associated with traditional non-aqueous solvent-based liquid electrolytes.

It is a further object of the present invention to provide a method for forming a structurally stable gelled electrolyte.

It is a further object of the present invention to provide electrochemical cells containing the structurally stable gelled electrolyte of this invention.

It is another object of the present invention to provide a structurally stable gelled electrolyte that has a high conductivity, high rate capability, and wide operating temperature range similar to levels associated with traditional non-aqueous solvent-based liquid electrolytes, while decreasing the environmental health and safety risks associated with the same.

According to the present invention, these and other objects are achieved by a structurally stable gelled electrolyte which comprises a base electrolyte, a radiation-curable polymer precursor and an electrically non-conducting solvent gelling agent. The invention combines the advantages of the polymer and gelled liquid electrolytes into a new "bonded gel." This structure has the high conductivity, high rate capability and wide operating temperatures of the gelled liquid electrolytes combined with the structural integrity which the polymer network electrolytes possess during manufacturing and storage.

In another aspect of the invention, the electrolyte is formed by mixing a base electrolyte containing a dissolved simple or complex ionizable alkaline metal salt in at least one aprotic liquid with at least one radiation curable polymer precursor. The electrolyte/precursor mixture is then blended with a chemically inert, electrically non-conduction solid to form a gelled compound. The gelled compound/radiation curable polymer precursor combination is coated onto a glass plate, metal foil or battery electrode and then cured in place.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

The structurally stable gelled electrolytes of the present invention include a base electrolyte, at least one three-dimensional polymer precursor that is radiation curable and an electrically non-conducting solvent gelling agent.

Base electrolytes of this invention are comprised of at least one aprotic liquid and at least one dissolved ionizable alkaline metal salt. The aprotic liquid may be composed of a single chemical compound (simple) or a combination of appropriate compounds (complex). The metal salt may be composed of a single salt (simple) or a combination of appropriate salts (complex). Preferably lithium salts such as those conventionally used in solid state electrochemical cells should be used. Specific examples of lithium salts include $LiAsF_6$, $LiClO_4$, $LiF_3CSO_3$, $LiBF_4$, $LiPF_6$, $LiN(CF_3SO_2)_2$, and the like. Other ionizable metal salts can be used including, for example, sodium, potassium, silver, calcium, magnesium, and the like.

Particularly useful aprotic liquids for use in the base electrolyte include propylene carbonate, ethylene carbonate, dimethyl carbonate, N,N-dimethylformamide and dimethoxyethane. Other useful groups of aprotic liquids include open chained or cyclic esters, open or cyclic ethers, acetonitrile, nitromethane, dimethylsulfite, ethylene sulfite, dimethylformamide, dimethysulfoxide, sulfolane, N-methylpyrrolidone or mixtures thereof. Specific examples of open-chained or cyclic esters include methyl formate, gammabutyrolactone, and ethyl acetate. Examples of open or cyclic ethers that are useful for the aprotic liquid of this invention include dimethyl ether, tetrahydrofuran, methyl tetrahydrofuran, and 1,3-dioxolan.

In accordance with the present invention, the base electrolyte is prepared in an argon drybox to exclude all traces of moisture. A first aprotic liquid, here propylene carbonate (PC), is added by pipette to a glass jar with a stir bar. Next, the ionizable alkaline metal salt, here $LiAsF_6$ is added to the PC under stirring. A second aprotic liquid source is added, here dimethoxyethane (DME). The DME is also pipetted in under stirring and the bottle is then tightly capped to preclude DME loss through evaporation.

Turning now to the radiation curable three-dimensional polymer precursor, any cross-linkable pre-cursor can be used. Particularly useful pre-cursors include trimethylolpropane ethoxy triacrylate (TMPEOTA) and poly(ethylene glycol) diacrylate (PEGDA). Other radiation curable materials that may be used in the present invention include acrylated epoxies, polyester acrylates, copolymers of glycidyl ethers, aliphatic or aromatic urethane oligomers and any suitable monoacrylate, methyacrylate and the like. The radiation curable three-dimensional polymer precursor is added to the base electrolyte prior to adding the electrically non-conducting solvent gelling agent.

The use of electron beam (E-beam) curing would be preferred with this invention because it is a fast, cool and energetic medium and does not require the use of a catalyst, which could be detrimental to long term battery operation. Thermal (IR) curing or ultra-violet (UV) radiation curing may also be used on the three dimensional polymer precursor. When using IR or UV radiation as the curing medium an appropriate catalyst needs to be included, such as benzophenone.

In the examples set forth for this invention curing was accomplished using UV radiation. In accordance with this method the catalyst benzophenone was added. The benzophenone is preferably ground up in a mortar with a pestle and added just prior to the gelling agents to prevent premature crosslinking of the acrylates by stray light.

Turning now to the electrically non-conducting solvent gelling agent of this invention, the preferred compound is a fumed silica. The compound used in the preferred embodiment is $SiO_2$, as provided by Degussa (Deutsche Gold- und Silber-Scheideanstalt) under the trade name of Aerosil 200®. The solvent gelling agent should be a solid powder or polymer with high surface area to adsorb the liquid electrolyte. Solid powders that are advantageous include inorganic oxygen compounds such as silica ($SiO_2$), titania ($TiO_2$), alumina ($Al_2O_3$), magnesium oxide (MgO), barium oxide ($B_2O_3$) and the like. Super absorbent polymers, clays, zeolite and such can also be used.

The structurally stable gelled electrolyte of this invention can be coated onto any suitable substrate. The inventor has successfully coated it onto a glass plate, metal foil and battery electrodes. It is anticipated that other substrates will work equally well. This electrolyte can be coated onto a battery electrode and cured into place or alternatively can be cured in a manner allowing the formation of a free standing shape which can then be further cured onto a cathode or anode, spooled up for use in other types of cells, or cut into shapes for example for button cells.

The following non-limiting exemplary embodiments illustrate the invention in more detail.

EXAMPLES

The structurally stable gelled electrolytes of this invention were poured out onto a glass plate and spread with a doctor blade down to 2–3 mils in thickness. The plate was then subjected to a 512 UV light inside an argon drybox (Braun) for 30–60 seconds, until dry to the touch. The pre-crosslinked electrolyte was also coated onto a strip of cathode or anode and cured in place. The preferred UV method for curing included coating a cathode well or glass plate with pre-crosslinked electrolyte mixture, then sending it through a 200 watts/in$^2$ mercury (Hg) lamp system at 8 feet per minute belt speed. Once the pre-cured electrolyte was spread out on the glass plate or electrode web, curing took place within 5 minutes to prevent DME loss or water absorption by the electrolyte.

The electrolyte mixtures used in the examples were:

Propylene Carbonate 30–50% by volume (Aldrich anhydrous grade)

Dimethoxy Ethane 70-50% by volume (Aldrich anhydrous grade)

Lithium Hexafluoroarsenate 1 Molar (FMC)

Benzophenone 1–3% by weight (mixture) (Aldrich)

The cross-linking agents used in the examples were:

Trimethylolpropane ethoxytriacrylate (TMPEOTA) (Radcure)

Polyethylene glycol diacrylate (PEGDA) (Radcure)

The gelling agents were:

Aerosil 200® (Degussa)

Aerosil R812® (Degussa)

Cab-O-Sil M5® (Cabot)

All of the lithium salts and gelling agents were heated to 150° C. under vacuum for forty eight (48) hours prior to use to remove any adsorbed water. The liquids were all stored over 4 Å molecular sieves prior to use. Actual cells were built and tested using $MnO_2$, $Ag_xV_yO_z$, and $V_2O_5$, with a lithium anode.

Example 1

5.64 grams of base electrolyte mixture (with a 50/50 volume mix of PC/DME), 0.12 grams of TMPEOTA, and 0.27 grams of Aerosil 200® were mixed together. This mixture was initially (precured) a very loose gel that would lose liquid when in contact with paper products or after standing for 48 hours. The gel could be spread with a doctor blade to 0.004 inches thick for curing. Curing was done under a 200 watt/inch lamp at a belt speed of 9 FPM. The cured film was flexible, pin-hole free, and self-supporting. Disks and rings could be cut from it and inserted into cells.

Example 2

6.32 grams of base electrolyte mixture (with a 30/70 volume mix of PC/DME), 0.13 grams of TMPEOTA, and 0.30 grams of Aerosil 200® were mixed together. This mixture was initially (precured) a very loose gel that would lose liquid when in contact with paper products or after standing for 48 hours. The gel could be spread with a doctor blade to 0.004 inches thick for curing. Curing was done under a 200 watt/inch lamp at a belt speed of 9 FPM. The cured film was flexible, pin-hole free, and self-supporting. Disks and rings could be cut from it and inserted into cells.

Example 3

6.47 grams of base electrolyte mixture (with a 50/50 volume mix of PC/DME), 0.06 grams of TMPEOTA, 0.06 grams of PEGDA, and 0.31 grams of Aerosil 200® were mixed together. This mixture was initially (precured) a very loose gel that would lose liquid when in contact with paper products or after standing for 48 hours. The gel could be spread with a doctor blade to 0.004 inches thick for curing. Curing was done under a 200 watt/inch lamp at a belt speed of 9 FPM. The cured film was flexible, pin-hole free, and self-supporting. Disks and rings could be cut from it and inserted into cells. This material was slightly more robust than that prepared in example 1.

Example 4

5.74 grams of base electrolyte mixture (with a 50/50 volume mix of PC/DME), 0.12 grams of TMPEOTA, and 0.27 grams of Aerosil R812® were mixed together. This mixture was initially (precured) a very loose gel that would lose liquid when in contact with paper products or after standing for 48 hours. The gel could be spread with a doctor blade to 0.004 inches thick for curing. Curing was done under a 200 watt/inch lamp at a belt speed of 9 FPM. The cured film was flexible, pin-hole free, but did not retain the liquid well even after curing. Disks and rings could be cut from it and inserted into cells only with difficulty.

Example 5

5.48 grams of base electrolyte mixture (with a 50/50 volume mix of PC/DME), 0.12 grams of TMPEOTA, and 0.27 grams of Cab-O-Sil M5® were mixed together. This mixture was initially (precured) a very loose gel that would lose liquid when in contact with paper products or after standing for 48 hours. The gel could be spread with a doctor blade to 0.004 inches thick for curing. Curing was done under a 200 watt/inch lamp at a belt speed of 9 FPM. The cured film was flexible, pin-hole free, and self-supporting. Disks and rings could be cut from it and inserted into cells. This mixture was very close in characteristics to Example 1.

It will therefore be understood that modifications and variations are possible without departing from the scope of the invention as expressed in the following claims.

I claim:

1. A structurally stable gelled electrolyte which comprises:
   a) a base electrolyte containing an ionizable metal salt and an aprotic liquid;
   b) an electrically non-conducting solvent gelling agent; and
   c) a radiation curable polymer precursor.

2. The structurally stable gelled electrolyte of claim 1 wherein the ionizable metal salt of the base electrolyte is a lithium salt.

3. The structurally stable gelled electrolyte of claim 2 wherein the aprotic liquid of the base electrolyte is selected from the group consisting of: open chained esters, cyclic esters, open chained ethers, and cyclic ethers.

4. The structurally stable gelled electrolyte of claim 3 wherein the open chained esters, cyclic esters, open chained ethers, and cyclic ethers are selected from the group consisting of: N-methylpyrrolidone, methyl formate, gammabutyrolactone, ethyl acetate, dimethyl ether, tetrahydrofuran, methyl tetrahydrofuran, 1, 3-dioxolan, and dimethoxyethane.

5. The structurally stable gelled electrolyte of claim 2 wherein the electrically non-conducting solvent gelling agent is selected from the group consisting of; solid powders of inorganic oxygen compounds and super absorbent polymers.

6. The structurally stable gelled electrolyte of claim 5 wherein radiation curable polymer precursor is selected from the group consisting of: trimethylol propane ethoxy triacrylate (TMPEOTA), poly(ethylene glycol) diacrylate (PEGDA), acrylated epoxies, polyester acrylates, copolymers of glycidyl ethers, monoacrylates, and methyacrylates.

7. The process of claim 2 wherein the aprotic liquid of the base electrolyte is selected from the group consisting of: propylene carbonate, ethylene carbonate, dimethyl carbonate, N,N-dimethylformamide, dimethoxyethane, acetonitrile, nitromethane, dimethylsulfite, ethylene sulfite, demethylformamide, dimethysulfoxide, and sulfolane.

8. The structurally stable gelled electrolyte of claim 1 coated on a battery electrode.

9. The structurally stable gelled electrolyte of claim 1 further comprising a substrate upon which the gelled electrolyte is coated, the substrate being selected from the group consisting of: plastic, metal, and glass.

10. The structurally stable gelled electrolyte of claim 1, wherein the ionizable metal salt is selected from the group consisting of: lithium salts, sodium salts, potassium salts, silver salts, calcium salts, and magnesium salts.

11. The structurally stable gelled electrolyte of claim 1, wherein the ionizable metal salt is a lithium salt selected from the group consisting of: $LiAsF_6$, $LiClO_4$, $LiF_3CSO_3$, $LiBF_4$, $LiPF_6$, and $LiN(CF_3SO_2)_2$.

12. The structurally stable gelled electrolyte of claim 1, wherein the aprotic liquid is selected from the group consisting of: open chained esters, cyclic esters, open chained ethers, and cyclic ethers.

13. The structurally stable gelled electrolyte of claim 1, wherein the aprotic liquid is selected from the group consisting of: propylene carbonate, ethylene carbonate, dimethyl carbonate, N,N-dimethylformamide, and dimethoxyethane.

14. The structurally stable gelled electrolyte of claim 1, wherein the aprotic liquid is selected from the group consisting of: acetonitrile, nitromethane, dimethylsulfite, ethylene sulfite, dimethylformamide, dimethysulfoxide, sulfolane, and N-methylpyrrolidone.

15. The structurally stable gelled electrolyte of claim 1, wherein the aprotic liquid is selected from the group consisting of: methyl formate, gammabutyrolactone, ethyl acetate, dimethyl ether, tetrahydrofuran, methyl tetrahydrofuran, and 1,3-dioxolan.

16. The structurally stable gelled electrolyte of claim 1, wherein the radiation curable polymer precursor is selected from the group consisting of: trimethylolpropane ethoxy triacrylate (TMPEOTA), poly(ethylene glycol) diacrylate (PEGDA), acrylated epoxies, polyester acrylates, copolymers of glycidyl ethers, aliphatic urethane oligomers, aromatic urethane oligomers, monoacrylate, and methyacrylate.

17. The structurally stable gelled electrolyte of claim 1, wherein the electrically non-conducting solvent gelling agent comprises fumed silica.

18. The structurally stable gelled electrolyte of claim 1, wherein the electrically non-conducting solvent gelling agent comprises $SiO_2$.

19. The structurally stable gelled electrolyte of claim 1, wherein the electrically non-conducting solvent gelling agent is selected from the group consisting of: solid powders of inorganic oxygen compounds and super absorbent polymers.

20. The structurally stable gelled electrolyte of claim 1, wherein the electrically non-conducting solvent gelling agent is selected from the group of solid powders of inorganic oxygen compounds consisting of: silica ($SiO_2$), titania ($TiO_2$), alumina ($Al_2O_3$), magnesium oxide (MgO), and barium oxide $B_2O_3$.

21. A process for forming a structurally stable gelled electrolyte which comprises:
  a) mixing an ionizable alkaline metal salt and an aprotic liquid to form a base electrolyte;
  b) combining the base electrolyte with a radiation curable polymer precursor;
  c) admixing the base electrolyte and polymer precursor with a chemically inert, electrically non-conducting compound to form a gelled composition;
  d) coating the gelled composition onto a substrate; and
  e) curing the gelled composition.

22. The process of claim 21 wherein the substrate is selected from the group consisting of: glass, plastic, and metal.

23. The process of claim 21 wherein the aprotic liquid is selected from the group consisting of: opened chained esters, cyclic esters, open chained ethers, and cyclic ethers.

24. The product of the process of claim 23.

25. The process of claim 23 wherein the open chained esters, cyclic esters, open chained ethers, and cyclic ethers are selected from the group consisting of: N-methylpyrrolidone, methyl formate, gammabutyrolactone, ethyl acetate, dimethyl ether, tetrahydrofuran, methyl tetrahydrofuran,1,3-dioxolan, and dimethoxyethane.

26. The process of claim 23 wherein the chemically inert non-conducting compound is selected from the group consisting of: solid powders of inorganic oxygen compounds and super absorbent polymers.

27. The product of the process of claim 26.

28. The process of claim 21 wherein the ionizable alkaline metal salt is a lithium salt.

29. The process of claim 28 wherein the aprotic liquid is selected from the group consisting of: open chained esters, cyclic esters, open chained ethers, and cyclic ethers.

30. The process of claim 29 wherein the group of open chained esters, cyclic esters, open chained ethers, and cyclic ethers is selected from the group consisting of: N-methylpyrrolidone, methyl formate, gammabutyrolactone, ethyl acetate, dimethyl ether, tetrahydrofuran, methyl tetrahydrofuran, 1,3-dioxolan, and dimethoxyethane.

31. The process of claim 28 wherein the chemically inert non-conducting compound is selected from the group consisting of: solid powders of inorganic oxygen compounds and super absorbent polymers.

32. The product of the process of claim 31.

33. The process of claim 31 wherein the radiation curable polymer precursor is selected from the group consisting of: trimethylolpropane ethoxy triacrylate (TMPEOTA), poly (ethylene glycol) diacrylate (PEGDA), acrylated epoxies, polyester acrylates, copolymers of glycidyl ethers, monoacrylates, and methyacrylates.

34. The product of the process of claim 33.

35. The process of claim 28 wherein the chemically inert non-conducting compound is selected from the group consisting of: silica ($SiO_2$), titania ($TiO_2$), alumina ($Al_2O_3$), magnesium oxide (MgO), and barium oxide ($B_2O_3$).

36. The product of the process of claim 35.

37. The process of claim 21 wherein the substrate is a battery electrode.

38. The process of claim 21 wherein the aprotic liquid is selected from the group consisting of: propylene carbonate, ethylene carbonate, dimethyl carbonate, N,N-dimethylformamide, dimethoxyethane, acetonitrile, nitromethane, dimethylsulfite, ethylene sulfite, demethylformamide, dimethysulfoxide, and sulfolane.

39. A method of forming a structurally stable gelled electrolyte comprising the steps of:

providing a mixture containing at least one ionizable metal salt and at least one aprotic liquid, the mixture forming a base electrolyte;

combining the base electrolyte with a radiation curable polymer precursor;

providing an electrically non-conducting solvent gelling agent in the base electrolyte and radiation curable polymer precursor combination to form a gelled composition; and exposing the gelled composition to radiation effective to care the composition.

40. A method of forming a structurally stable gelled electrolyte on a substrate which comprises:

coating a substrate with R mixture which comprises an ionizable metal salt, an aprotic liquid, a radiation curable polymer precursor, and an electrically non-conducting solvent gelling agent; and curing the mixture to form a structurally stable gelled electrolyte on the substrate.

41. The method of claim 40, wherein said curing includes exposing the mixture to a radiation source, the radiation source comprising an electron beam radiation source.

42. The method of claim 40, wherein said curing includes exposing the mixture to a radiation source, the radiation source comprising an ultra-violet radiation source.

* * * * *

UNITED STATES PATENT AND TRADEMARK OFFICE
CERTIFICATE OF CORRECTION

PATENT NO. : 5,648,011
DATED : July 15, 1997
INVENTOR(S) : Peter M. Blonsky

It is certified that error appears in the above-indentified patent and that said Letters Patent is hereby corrected as shown below:

Column 10, line 6, replace "care", with --cure--.

Column 10, line 9, replace "R" with --a--.

Signed and Sealed this

Eleventh Day of November, 1997

Attest:

BRUCE LEHMAN

Attesting Officer

Commissioner of Patents and Trademarks